(12) United States Patent
Chen et al.

(10) Patent No.: US 10,857,609 B2
(45) Date of Patent: Dec. 8, 2020

(54) NON-CONTACT WIRE ARRAY TENSION CONTROL DEVICE

(71) Applicant: National Taiwan Normal University, Taipei (TW)

(72) Inventors: Shun-Tong Chen, Taipei (TW); Li-Wen Huang, Taipei (TW); Jin-Ping Guo, Taipei (TW); Ting-Cheng Bai, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 407 days.

(21) Appl. No.: 15/924,832

(22) Filed: Mar. 19, 2018

(65) Prior Publication Data

US 2018/0264573 A1 Sep. 20, 2018

(30) Foreign Application Priority Data

Mar. 20, 2017 (TW) .............................. 106109107 A

(51) Int. Cl.
| | | |
|---|---|---|
| *B65H 49/32* | (2006.01) | |
| *B65H 59/04* | (2006.01) | |
| *B23H 7/10* | (2006.01) | |
| *B23H 1/02* | (2006.01) | |

(52) U.S. Cl.
CPC ............. *B23H 7/104* (2013.01); *B65H 49/32* (2013.01); *B65H 59/04* (2013.01); *B23H 1/028* (2013.01); *B65H 2701/36* (2013.01)

(58) Field of Classification Search
CPC .................................. B23H 7/104; B65H 59/04
See application file for complete search history.

(56) References Cited

U.S. PATENT DOCUMENTS

| | | | | |
|---|---|---|---|---|
| 4,958,780 A | * | 9/1990 | Bruenn ................... | B65H 59/04 242/486.8 |
| 5,709,347 A | * | 1/1998 | Hoffmann .............. | B65H 59/04 192/69.42 |

FOREIGN PATENT DOCUMENTS

| | | |
|---|---|---|
| CN | 101552136 | 4/2011 |
| TW | 200635683 | 10/2006 |

* cited by examiner

*Primary Examiner* — William E Dondero

(57) ABSTRACT

The present invention provides a non-contact wire array tension control device for controlling a plurality of tension respectively corresponding to a plurality of electrical discharge wires, including delivering spools and electromagnets. The delivering spool has a magnetic end and a wire outputting end, the wire outputting end is coupled with an electrical discharge wire for outputting the electrical discharge wire. A plurality of electromagnets are coupled to the corresponding magnetic end for controlling a spin rate of the corresponding delivering spool, wherein the spin rate of the corresponding delivering spool is controlled by adjusting a magnetic force generated by the electromagnet. Moreover, a magnetic direction of the electromagnet is parallel to an axial direction of the delivering spool. The invention uses the electromagnets to control the magnetic damping force of the delivering spools for simultaneously controlling the tension of the electrical discharge wires by non-contact method.

9 Claims, 6 Drawing Sheets

NON-CONTACT WIRE ARRAY TENSION CONTROL DEVICE

CROSS-REFERENCE TO RELATED APPLICATIONS

This application claims the priority benefit of Taiwan Application Serial No. 106109107 filed Mar. 20, 2017 the disclosure of which is incorporated herein by reference.

BACKGROUND OF THE INVENTION

1. Field of the Invention

The present invention relates to a non-contact wire array tension control device, and more particularly, to a non-contact wire array tension control device which can control a plurality of tension respectively corresponding to a plurality of electrical discharge wires.

2. Description of the Prior Art

In recent years, the manufacturing needs of the industry tend to be slim and light. Most of the manufacturing materials are made of hard-to-cut materials, such as tungsten, boron nitride, polycrystalline diamond, and single crystal diamond. In order to process the above-mentioned hard-to-cut materials, electrical discharge machining (EDM) are used to accomplish the workpiece requirement with light and slim.

In wire-cut EDM technology, the wire tension control is one of the important factors that affect the machining accuracy and which can also be used to determine whether the wire electrode is broken. In practice, most of the wire electrodes are used with wheel brake system to control the wire tension. The frictional force generated by the direct contact of wheel brake system and the electrical discharge wire therefore increases the instability of the wire electrode. Another wire-cut EDM technology utilizes non-contact control method by replacing the wheel brake system with the permanent magnet. However, with the conventional control method of using permanent magnets, the wire tension is controlled by adjusting the distance between the permanent magnet and the wire electrode. The adjustment range of the distance is limited and the wire tension cannot be accurately regulated. Furthermore, if there are multiple wire electrodes needed to be simultaneously operated for high-efficiency cutting, it is difficult to adjust a plurality of wire tension for wire electrodes having an array arrangement.

In the prior art described above, there are still many deficiencies which need to be improved. Therefore, the present invention provides a non-contact wire array tension control device which can control a plurality of tension respectively corresponding to a plurality of electrical discharge wires by using electromagnets, wherein the electromagnets are with adjustable magnetic force to fine-tune the spin rate of the spools.

SUMMARY OF THE INVENTION

Therefore, the present inventor with many years engaged in the manufacture and development of related products and design experience went through the detailed design and careful assessment to finally confirm that the present invention is practically usable.

The present invention provides a non-contact wire array tension control device which can control a plurality of tension respectively corresponding to a plurality of electrical discharge wires. According to one embodiment, the present invention comprises a plurality of delivering spools and a plurality of electromagnets. Each delivering spool comprises a magnetic end and a wire outputting end, and the wire outputting end is coupled with an electrical discharge wire for outputting the electrical discharge wire. Each electromagnet is coupled to the corresponding magnetic end for controlling a spin rate of the corresponding delivering spool, wherein the spin rate of the corresponding delivering spool is controlled by adjusting a magnetic force generated by the electromagnet, and the magnetic force applying to the magnetic end is controlled by electricity.

Wherein each magnetic end is coupled with a plurality of electromagnets and a magnetic direction of the electromagnet is parallel to an axial direction of the delivering spool. The tension of the electrical discharge wire is controlled by a magnetic damping force of the corresponding delivering spool, wherein the magnetic damping force is generated in response to the corresponding magnetic forces applied to the corresponding delivering spool.

The magnetic end mentioned above comprises a magnetically conductive spacer, and the magnetic force of the electromagnet is applied to the magnetically conductive spacer for adjusting the spin rate of the delivering spool.

Besides, the non-contact wire array tension control device further comprises a collecting spool for receiving the plurality of electrical discharge wires.

The wire speed of the electrical discharge wire is controlled by a spin rate of the collecting spool.

Furthermore, the non-contact wire array tension control device further comprises a DC motor for driving the collecting spool to receive the electrical discharge wires.

Compared to the prior art, the present invention provides a non-contact wire array tension control device which uses electromagnets with adjustable magnetic force to fine-tune the spin rate of the delivering spool in order to adjust the tension of the electrical discharge wire. More particularly, the non-contact wire array tension control device in the present invention can fine-tune a plurality of spin rates of the delivering spools respectively corresponding to a plurality of electromagnets in order to provide electrical discharge wires having the same or different wire tensions; therefore, the non-contact wire array tension control device can be achieved the effect of improving the cutting efficiency of wire-cut EDM technology with multiple wires.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

The advantages, sprits, and features of the present invention will be explained and discussed with embodiments and figures as following.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims.

The scope of the present invention will in no way be limited to the number of constituting components, the materials thereof, the shapes thereof, the relative arrangement thereof, etc., and are disclosed simply as an example of embodiments of the present invention.

Figure 1:
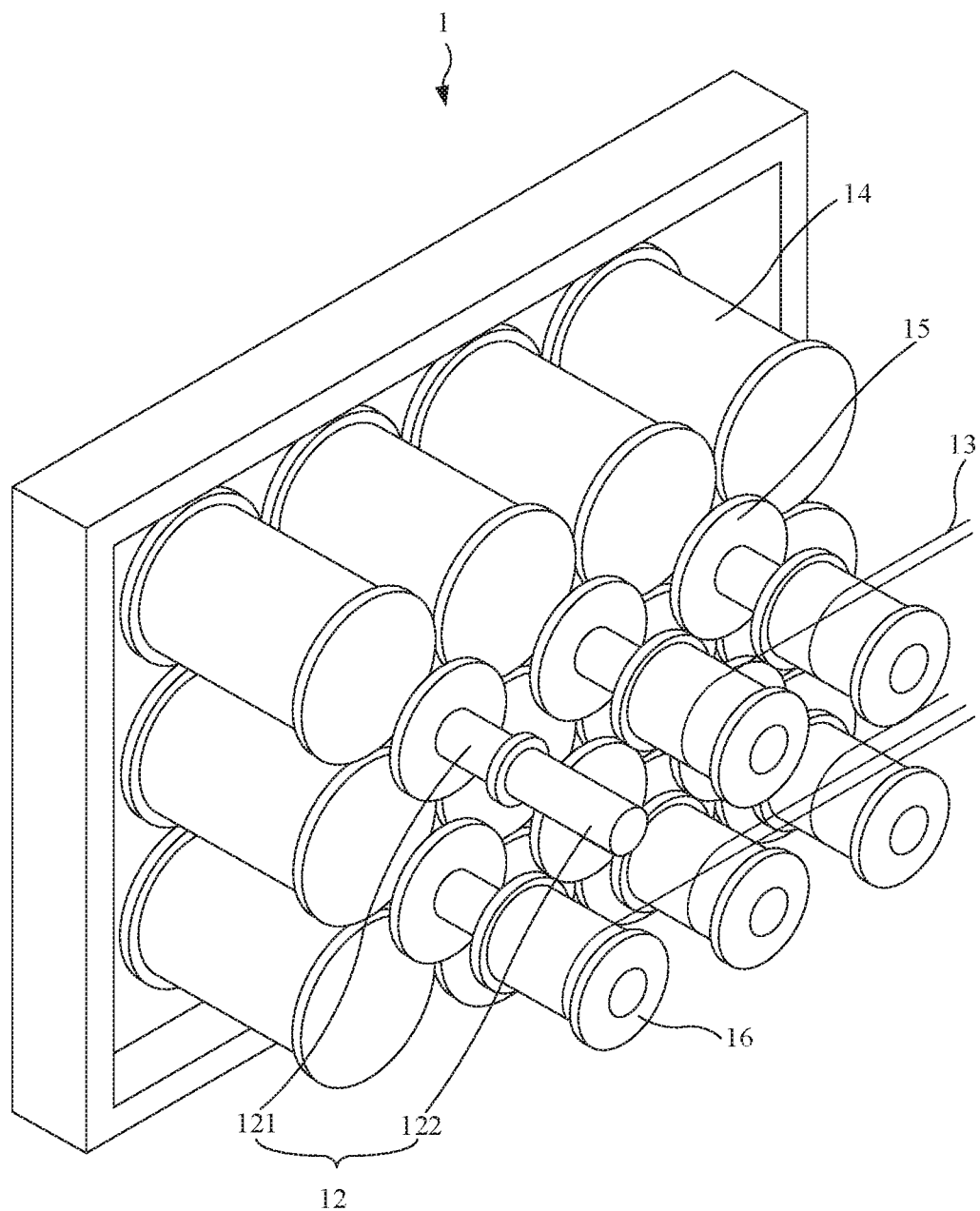
FIG. 1 shows a schematic diagram of the non-contact wire array tension control device in one embodiment of the present invention.

Please refer to FIG. 1. FIG. 1 shows a schematic diagram in one embodiment of the present invention non-contact wire array tension control device 1. According to one embodiment, the non-contact wire array tension control device 1 comprises a plurality of delivering spools 12 and a plurality of electromagnets 14. Each delivering spool 12 comprises a magnetic end 121 and a wire outputting end 122, and the wire outputting end 122 is coupled with an electrical discharge wire 13 for outputting the electrical discharge wire 13. Each electromagnet 14 is coupled to the corresponding magnetic end 121 for controlling a spin rate of the corresponding delivering spool 12, wherein the spin rate of the corresponding delivering spool 12 is controlled by adjusting a magnetic force generated by the electromagnet 14, and the magnetic force applying to the magnetic end 121 is controlled by electricity.

Wherein each magnetic end 121 is coupled with a plurality of electromagnets 14, a magnetic direction of the electromagnet 14 is parallel to an axial direction of the delivering spool 12. The tension of the electrical discharge wire 13 is controlled by a magnetic damping force of the corresponding delivering spool 12, wherein the magnetic damping force is generated in response to the corresponding magnetic forces applied to the corresponding delivering spool 12.

In one embodiment, the plurality of delivering spools 12 are in one array, and the plurality of electromagnets 14 are in another array. The two arrays are in parallel to form that the delivering spools 12 array being coupled to one side of the electromagnets 14 array. In another embodiment, the plurality of delivering spools 12 and the plurality of electromagnets 14 may respectively be arranged in different forms of regular or irregular arrays according to different needs.

In practice, the non-contact wire array tension control device 1 further comprises a storage barrel 16 coupled to the wire outputting end 122, wherein the electrical discharge wire 13 is wound on the storage barrel 16. More particularly, the storage barrel 16 is changeably coupled to the wire outputting end 122 in order to exchange the electrical discharge wire 13 efficiently and conveniently. It should be noticed that in order to make the picture clearer, only a single electrical discharge wire 13 is shown on each storage barrel 16 in FIG. 1. In practice, the storage barrel 16 may be wound with sufficient wires 13 for wire-cut electrical discharge machining (EDM), and the storage barrel 16 is changeably coupled to the wire outputting end 122 so as to form a convenient and efficient alternative device. Moreover, the wire outputting end 122 are arranged in an adjustable relative position. In one embodiment, the wire outputting end 122 includes a fixing part for clamping the storage barrel 16 to prevent the storage barrel 16 from slipping relative to the wire outputting end 122. In addition, the electrical discharge wire 13 may be any metal wire, such as tungsten wire. More specifically, the diameter of the tungsten wire can be 13 mm. In one embodiment, the electrical discharge wires 13 may be wires of different materials or diameters respectively so as to form the wires with different tension or different wire-cut EDM efficiencies.

In practice, the magnetic end 121 comprises a magnetically conductive spacer 15, and the magnetic force generated by the electromagnet 14 is applied to the magnetically conductive spacer 15 for adjusting the spin rate of the delivering spools 12. In one embodiment, the magnetically conductive spacer 15 can be a magnetic element. More specifically, the magnetically conductive spacer 15 can be a mild steel magnetically conductive spacer.

Figure 2:
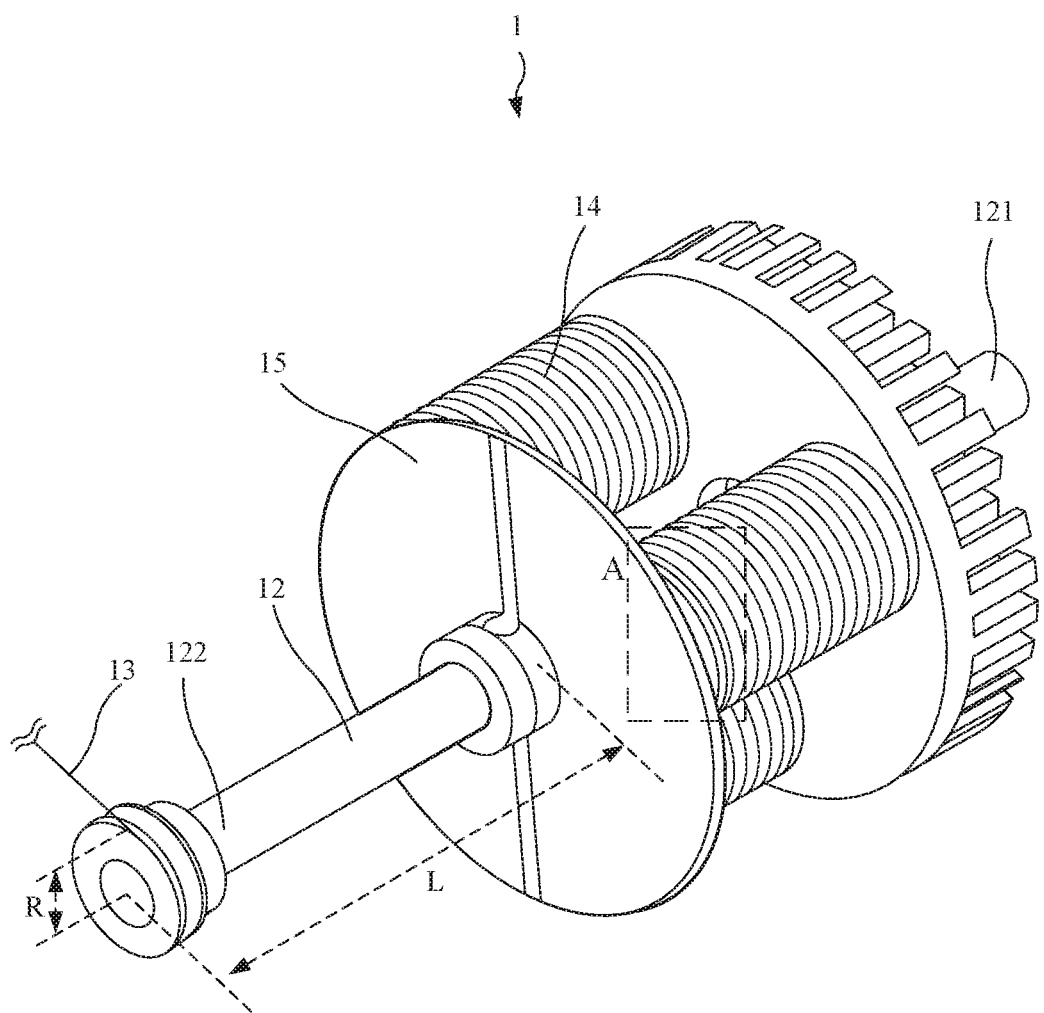
FIG. 2 shows a schematic diagram of a delivering spool of the non-contact wire array tension control device in another embodiment of the present invention.

Please refer to FIG. 2. FIG. 2 shows a schematic diagram of a delivering spool 12 in another embodiment of the present invention non-contact wire array tension control device 1. In one embodiment, the delivering spool 12 may correspond to three electromagnets 14, wherein the electromagnets 14 are used for controlling the wire tension of the electrical discharge wire 13. In one embodiment, the magnetic end 121 can be inserted in the corresponding electromagnet 14 array in order to prevent the bearing of the delivering spool 12 from offset.

Since the magnetic direction of the electromagnet 14 is parallel to the axial direction of the delivering spool 12, the magnetically conductive spacer 15 of the delivering spool 12 is easily to be magnetically coupled with the plurality of electromagnets 14, and vice versa. This means that the non-contact wire array tension control device 1 in the present invention can apply a magnetic force to the magnetically conductive spacer 15 of the delivering spool 12. And each delivering spool 12 is allowed to be controlled by multiple electromagnets 14, such as three electromagnets 14 shown in FIG. 2. On the other hand, multiple delivering spools 12 are allowed to be controlled by single electromagnet 14. Therefore the wire-cut EDM with electrical discharge wires having the same or different wire tensions are achieved.

Figure 3:
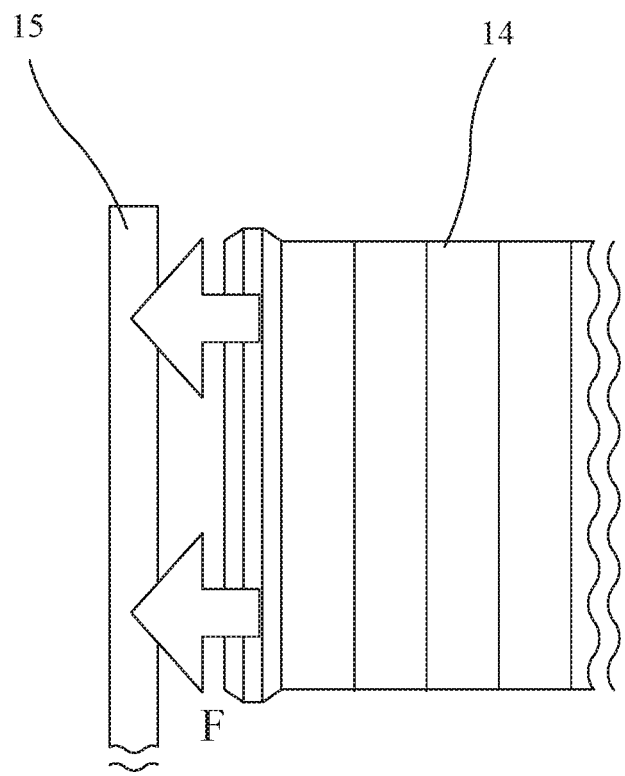
FIG. 3 shows a schematic diagram of the magnetic direction of the magnetic force in FIG. 2.

Please refer to FIG. 3. FIG. 3 shows a schematic diagram of the magnetic direction of the magnetic force F in FIG. 2. In order to show the magnetic direction of the magnetic force F in FIG. 2, the part A in FIG. 2 is zoomed in and shown as a side view, shown as FIG. 3. The magnetic direction of the electromagnet 14 is parallel to the axial direction of the delivering spool 12, and the electromagnet 14 keeps a constant distance from the magnetically conductive spacer 15. The electromagnet 14 does not directly contact with the magnetically conductive spacer 15. Therefore, there is no friction generated between the delivering spool 12 and the electromagnet 14. As a result, delivering spool 12 is rotated without frictional energy loss and component wear, and therefore avoids unnecessary vibration caused by friction.

Please refer to FIG. 2 and FIG. 3 again. The non-contact wire array tension control device 1 utilizes the changing of magnetic field caused by the plurality of electromagnets 14 according to the Lenz's law. The changing of magnetic field therefore generates a magnetic attraction force which is applied to the magnetically conductive spacer 15 to achieve the effect of magnetic damping force f. In addition, the magnetic damping force f satisfies the following function $f=F\times\mu$ and the equation of torque $T\times R=f\times L$. Wherein F represents magnetic force, $\mu$ represents permeability, T represents wire tension, R represents the radius of the delivering spool 12, and L represents the distance between the magnetic damping force f and electrical discharge wire 13.

According to the functions of the present invention mentioned above, the voltage or current parameters of each electromagnet 14 can be adjusted to output different magnetic force F for achieving different effect of magnetic damping force f. Therefore, the spin rate of each delivering spool 12 is adjusted and each delivering spool 12 tightens the corresponding electrical discharge wire 13 for producing the same or different wire tension. In one embodiment, when the same voltage and current are applied to each electromagnet 14, and the electromagnets 14 and the delivering spools 12 are arranged regularly in an array respectively, the sum of the magnetic force F received by each delivering spool 12 can be the same. Therefore, each electrical discharge wire 13 with applying the same magnetic force F attributes to an identical wire tension. In practice, in order to ensure the stability of wire tension, temperature control and wire tension calculation modules are applied to monitor the accuracy of wire tension. Besides, the wire speed of the electrical discharge wires 13 can be controlled by the spin rate of the delivering spools 12. In another practice, the winding direction of the electrical discharge wire 13 is the same as the rotating direction of the delivering spool 12.

Figure 4:
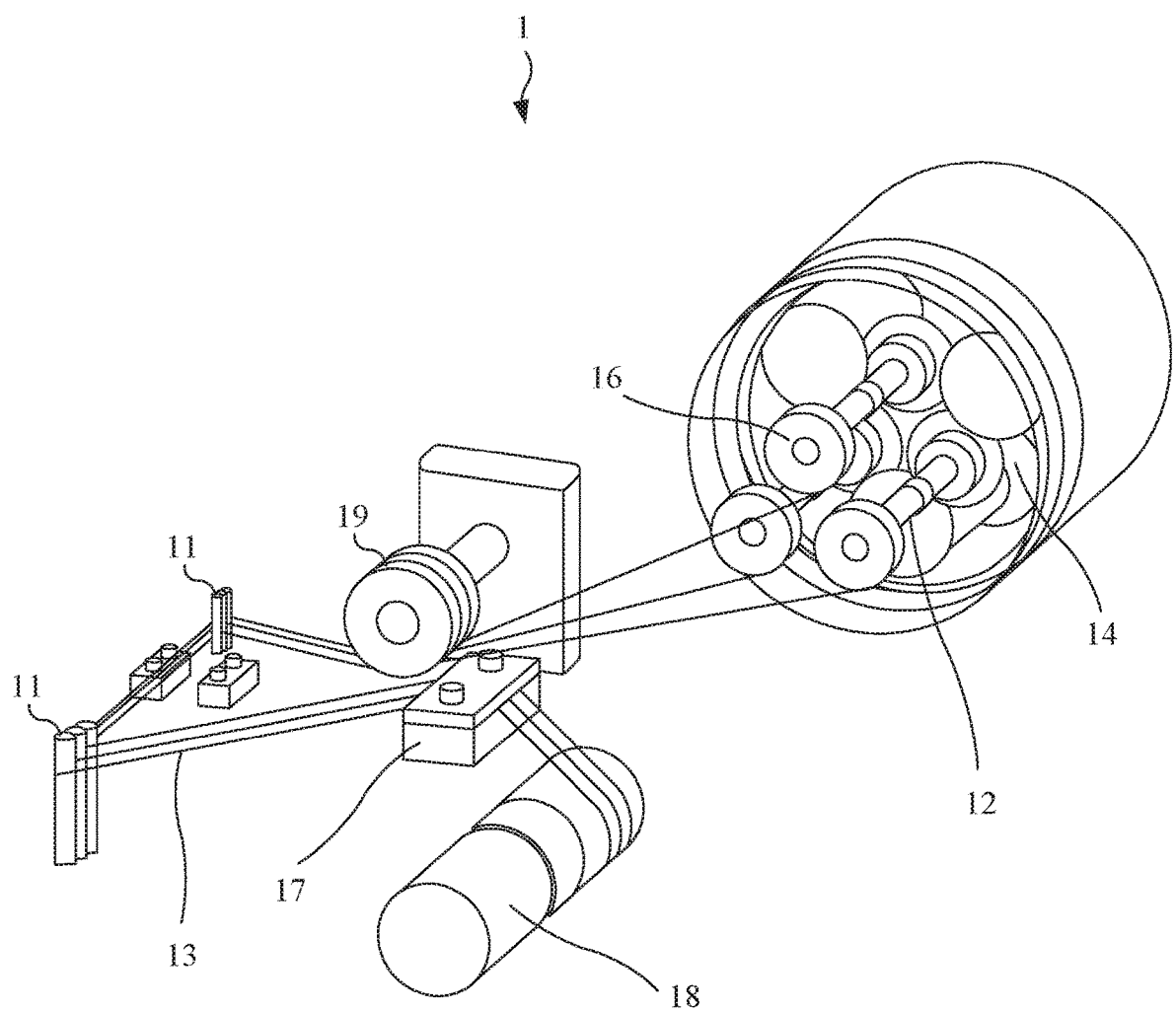
FIG. 4 shows a schematic diagram of the non-contact wire array tension control device in the other embodiment of the present invention.
Figure 5:
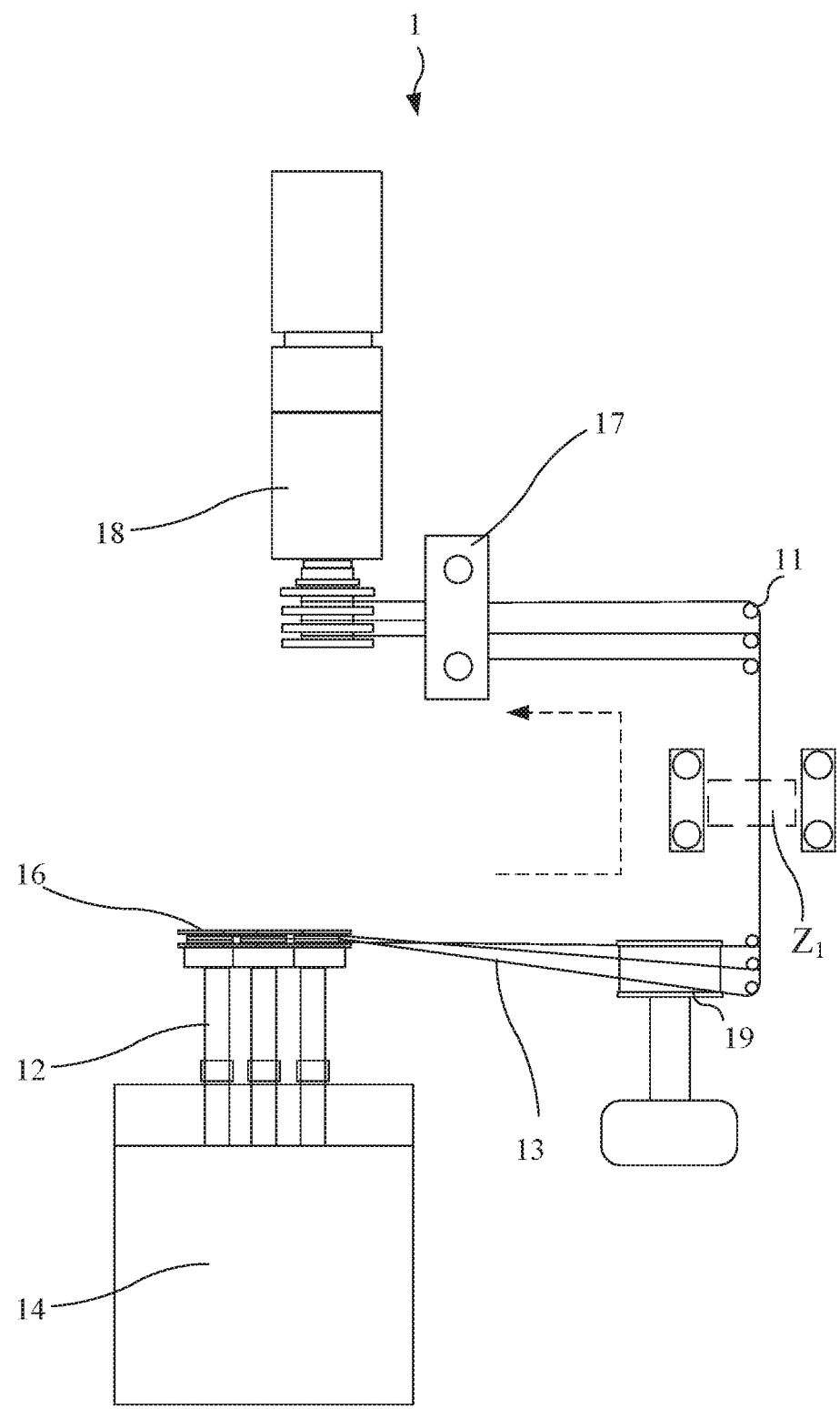
FIG. 5 shows a schematic diagram of the top view in FIG. 4.
Figure 6:
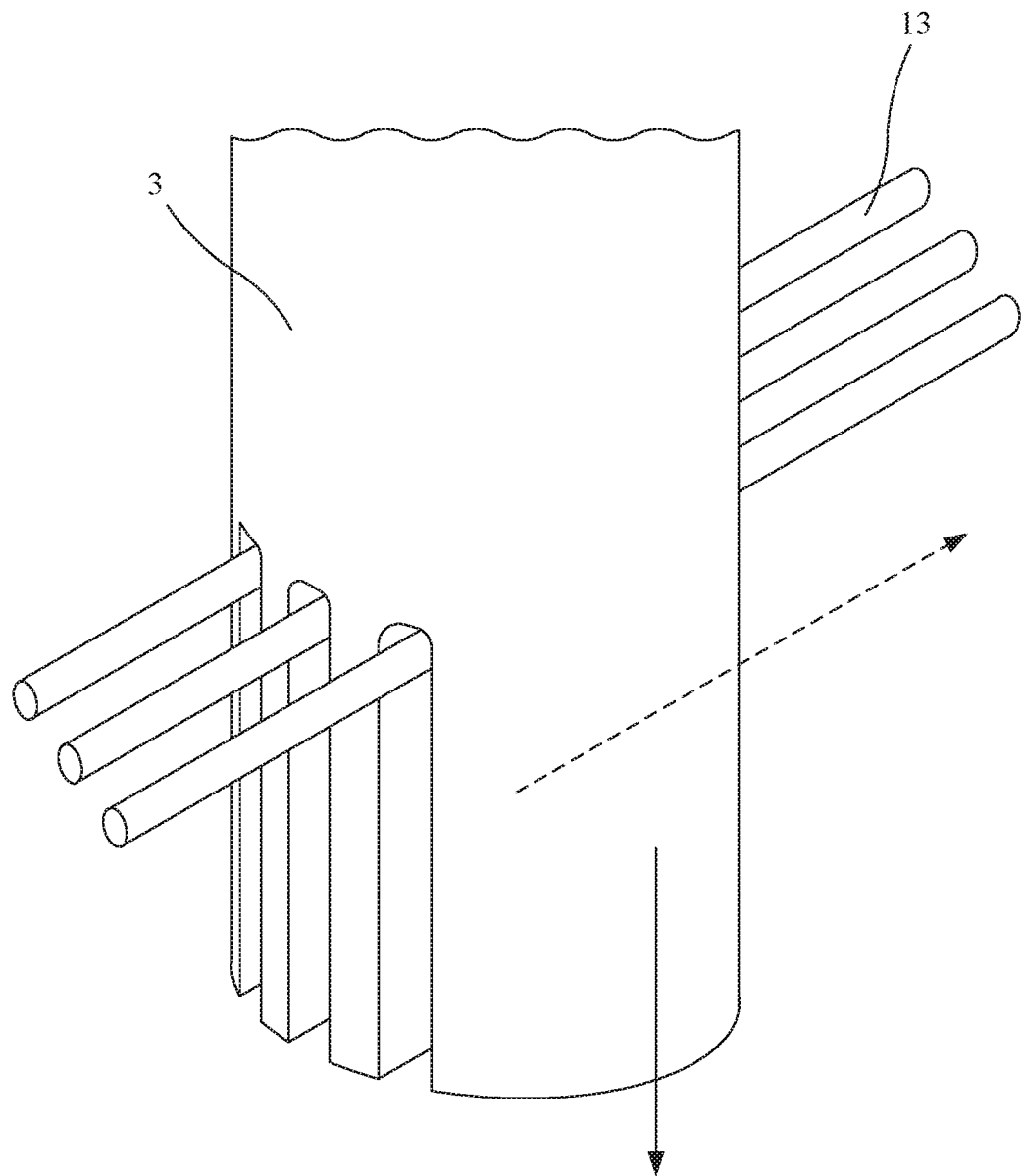
FIG. 6 shows a schematic diagram of the cutting area in FIG. 5.

Please refer to FIG. 4, FIG. 5, and FIG. 6. FIG. 4 a schematic diagram of the non-contact wire array tension control device 1 in the other embodiment of the present invention, FIG. 5 shows a schematic diagram of the top view in FIG. 4, and FIG. 6 shows a schematic diagram of the cutting area $Z_1$ in FIG. 5. In practice, the non-contact wire array tension control device 1 further comprises a collecting spool 18 for receiving the electrical discharge wire 13. In one embodiment, the wire tension of the electrical discharge wire 13 is controlled by the magnetic damping force of the delivering spool 12. The wire speed of the electrical discharge wire 13 is controlled by the spin rate of the collecting spool 18. In addition, the non-contact wire array tension control device 1 further comprises a DC motor for performing constant-speed motion and driving the collecting spool 18 to receive the electrical discharge wires 13 with the constant speed. In one embodiment, the DC motor controls the collecting spool 18 with a spin rate of 1 rpm for making an identical wire speed with the electrical discharge wires 13. In practice, the to-be-cut workpiece 3 is placed in the cutting area $Z_1$ and the to-be-cut workpiece 3 is moved downwards in the direction of the solid arrow in FIG. 6. The electrical discharge wires 13 are driven by the collecting spool 18 in the direction of the dotted arrow under constant-speed motion for cutting the to-be-cut workpiece 3.

Please refer to FIG. 4 and FIG. 5 again. In one embodiment, the non-contact wire array tension control device 1 further comprises a steering part 11 for steering the moving direction of the electrical discharge wire 13. In another embodiment, the non-contact wire array tension control device 1 comprises plurality sets of steering parts 11 for generating a plurality of cutting areas $Z_1$ by using the same delivering spool 12 array and the same collecting spool 18. In addition, the non-contact wire array tension control device 1 further comprises an adjusting wheel 19 for guiding the direction of the electrical discharge wire 13 and controlling the distance between each electrical discharge wire 13. In one embodiment, the non-contact wire array tension control device 1 may comprises a plurality of adjusting wheels 19 for preventing the electrical discharge wire 13 from disturbing to each other. In addition, the non-contact wire array tension control device 1 further comprises a shock absorber 17 configured in the area between the delivering spool 12 and the collecting spool 18 where the electrical discharge wire 13 goes through. In one embodiment, the shock absorber 17 is configured in front of the collecting spool 18 in order to stabilize the electrical discharge wire 13 and prevent the wire from swinging. Besides, the shock absorber 17 can also remove the dirt on the electrical discharge wire 13 before it is being collected by the collecting spool 18 so as to stabilize the collecting speeds. Furthermore, the shock absorber 17 located in front of the collecting spool 18 can suppress the vibration generated during the transmission of the electrical discharge wire 13, so that the electrical discharge wire 13 can maintain a fairly straightness in the cutting area $Z_1$. Wherein the shock absorber 17 can be a high-density shock absorbing sponge.

Compared to the prior art, the present invention provides a non-contact wire array tension control device which uses electromagnets with adjustable magnetic force to fine-tune the spin rate of the delivering spool in order to adjust the tension of the electrical discharge wire. More particularly, the non-contact wire array tension control device in the present invention can fine-tune a plurality of spin rates of the delivering spools respectively corresponding to a plurality of electromagnets in order to provide electrical discharge wires having the same or different wire tensions; therefore, the non-contact wire array tension control device can be achieved the effect of improving the cutting efficiency of wire-cut EDM technology with multiple wires.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A non-contact wire array tension control device for controlling a plurality of tension respectively corresponding to a plurality of electrical discharge wires, comprising:
   a plurality of delivering spools, wherein each delivering spool comprises a magnetic end and a wire outputting end, and the wire outputting end is coupled with an electrical discharge wire for outputting the electrical discharge wire; and
   a plurality of electromagnets coupled to the corresponding magnetic end for controlling a spin rate of the corresponding delivering spool, wherein the spin rate of the corresponding delivering spool is controlled by adjusting a magnetic force generated by the electromagnet, and the magnetic force applying to the magnetic end is controlled by electricity;
   wherein each magnetic end is coupled with a plurality of electromagnets, a magnetic direction of the electromagnet is parallel to an axial direction of the delivering spool; the tension of the electrical discharge wire is controlled by a magnetic damping force of the corresponding delivering spool, wherein the magnetic damping force is generated in response to the corresponding magnetic forces applied to the corresponding delivering spool.

2. The non-contact wire array tension control device of claim 1, further comprising a storage barrel coupled to the wire outputting end, wherein the electrical discharge wire is wound on the storage barrel.

3. The non-contact wire array tension control device of claim 2, wherein the storage barrel is changeably coupled to the wire outputting end.

4. The non-contact wire array tension control device of claim 1, wherein the electrical discharge wire is a metal wire.

5. The non-contact wire array tension control device of claim 1, wherein the magnetic end comprises a magnetically conductive spacer, and the magnetic force of the electromagnet is applied to the magnetically conductive spacer for adjusting the spin rate of the delivering spools.

6. The non-contact wire array tension control device of claim 1, further comprising a collecting spool for receiving the electrical discharge wire.

7. The non-contact wire array tension control device of claim 6, wherein a wire speed of the electrical discharge wire is controlled by a spin rate of the collecting spool.

8. The non-contact wire array tension control device of claim 6, further comprising a DC motor for driving the collecting spool to receive the electrical discharge wires.

9. The non-contact wire array tension control device of claim 1, wherein a winding direction of the electrical discharge wire is the same as a rotating direction of the delivering spool.

* * * * *